Figure 1:
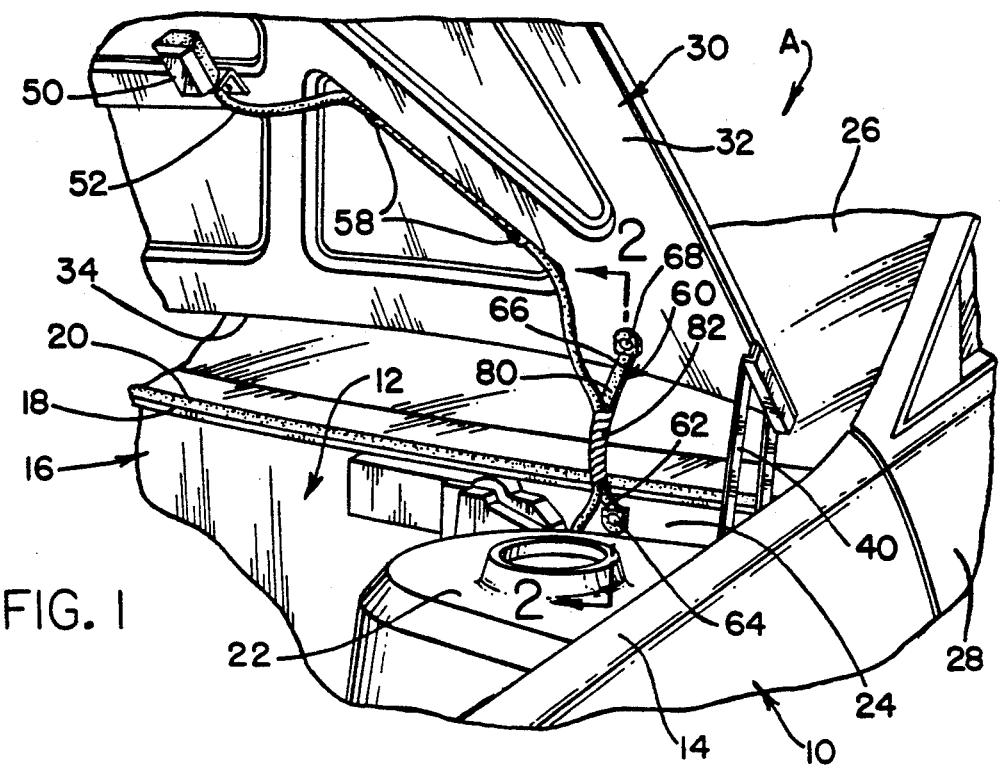

United States Patent [19]

Wenzlick

[11] Patent Number: 5,307,248
[45] Date of Patent: Apr. 26, 1994

[54] UNDERHOOD LAMP WIRING STRAP

[75] Inventor: Stanley J. Wenzlick, Chesaning, Mich.

[73] Assignee: General Motors Corporation, Detroit, Mich.

[21] Appl. No.: 93,566

[22] Filed: Jul. 19, 1993

[51] Int. Cl.⁵ ............................................. B60Q 3/06
[52] U.S. Cl. ...................................... 362/80; 362/156
[58] Field of Search ................. 362/61, 80, 155, 156, 362/387, 391

[56] References Cited

U.S. PATENT DOCUMENTS 4,054,789 10/1977 Romanelli ............................ 362/80
4,628,417 12/1986 Kaminski et al. .................. 362/80 X Primary Examiner—Stephen F. Husar
Attorney, Agent, or Firm—William A. Schuetz

[57] ABSTRACT

A plastic strap to which an underhood electrical cable for an underhood lamp is taped has one end connected to the hood adjacent its rear end and its other end connected to vehicle body structure adjacent a seal at the rear end of an engine compartment. The strap is at all times self-biased toward a circular loop position away from the seal so that the electrical cable cannot fold back on itself and be pinched between the hood and the seal when the hood is in its closed position.

5 Claims, 1 Drawing Sheet

UNDERHOOD LAMP WIRING STRAP

The present invention relates to a lamp wiring retainer and, more particularly, to a lamp wiring strap for at all times retaining a lamp wire connected to a lamp on a closure member of an automotive vehicle away from a sealing juncture between the closure member and adjacent body structure of the vehicle.

It is common in automotive vehicles to provide a lamp mounted to an underside of a closure member, such as a hood or deck lid of the vehicle, the hoods or deck lids are usually pivotally mounted to body structure on the vehicle which defines a compartment such as the engine compartment or a trunk compartment. The hoods or deck lids are usually movable between a closed position in which access to the compartment is prevented and an open position in which access to the compartment is permitted. The lamps are usually connected to a wiring harness via a wire cable or lead secured to the underside of the closure and which extends into the adjacent compartment of the vehicle.

One of the problems that can be encountered with a wire cable connected to the underside of the hood or deck lid and running into the compartment is that the wire can fold back on itself and be pinched between the hood or deck lid and the seal surrounding the compartment when the closure is moved to its closed position. Repeated pinching is not only deleterious to the lamp wire cable, but is also not aesthetically pleasing.

It is known to route the lamp cable wire along the hinges for the hood or deck lid, especially when goose necked hinges are employed. While this usually overcomes the fold back and pinch problem, it also requires that the wire be located at the hinge and not, perhaps at some more convenient location.

In accordance with the provisions of the present invention, the lamp wire can be located at any convenient location and the above-noted fold back and pinch problem is eliminated. This is accomplished by providing a self-biased strap which has one end connected to the closure and its other end connected to the body structure defining the compartment and which is self-biased towards a generally circular loop position away from the sealing or mating surfaces between the closure and the body structure. The wire is simply secured to the strap on its forward side, such as via taping, and is thus always self-biased away from any position in which it can be fold back. This eliminates the fold back problem, eliminates the pinching problem and is a solution which is simple, inexpensive and foolproof.

Figure 2:
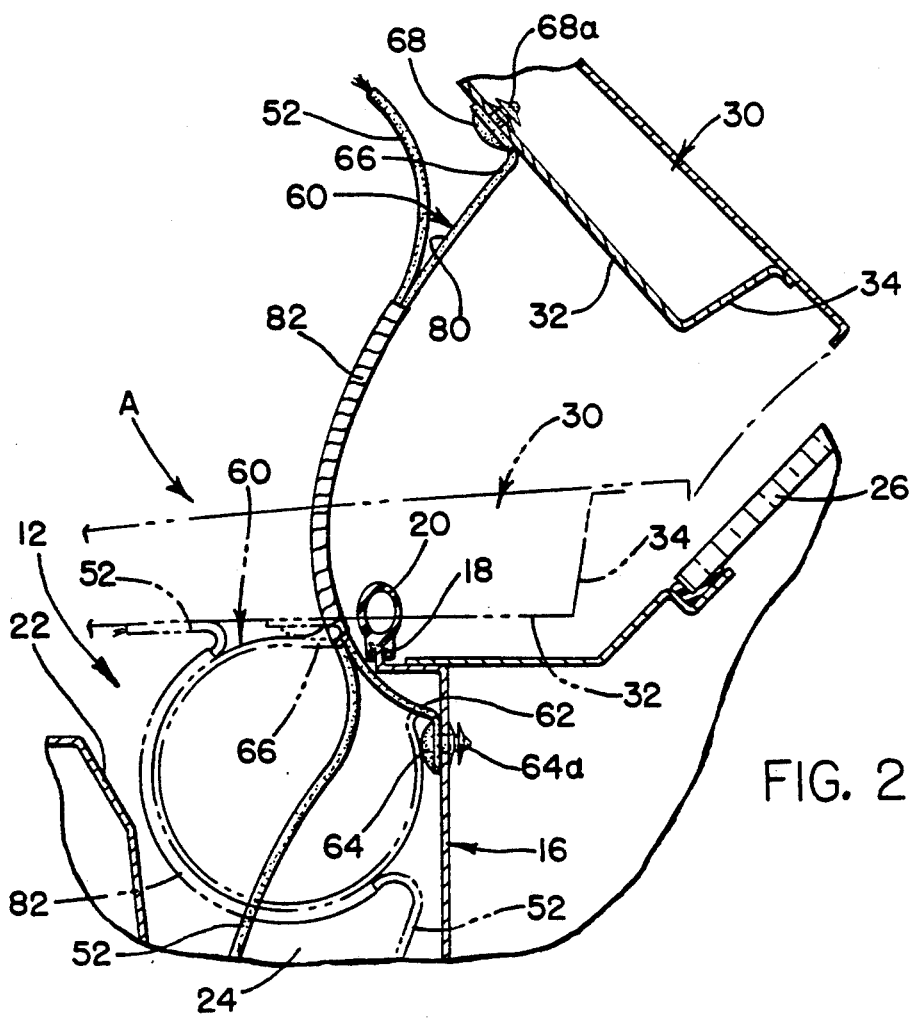

The present invention further resides in various novel constructions and arrangement of parts, and further objects, novel characteristics and advantages of the present invention will be apparent to those skilled in the art to which it relates and from the following detailed description of the illustrated, preferred embodiment thereof made with reference to the accompanying drawings forming a part of this specification and in which similar reference numerals are employed to designate corresponding parts throughout the several views, and in which:

FIG. 1 is a fragmentary perspective view of an automotive vehicle and showing the novel lamp wiring strap of the present invention; and FIG. 2 is an enlarged cross-sectional view taken approximately along line 2-2 of FIG. 1.

Referring to FIG. 1, an automotive vehicle A is thereshown. The vehicle A includes forward body structure 10 which defines an engine compartment 12. The body structure 10 includes left and right fenders 14 (only the rightmost fender 14 is shown in the drawings), a rear fire wall 16 and a front end structure including a grill (not shown). The rear fire wall 16 has an upturned flange 18 to which a suitable seal 20 extending transversely of the vehicle is secured. Disposed within the engine compartment 12 is also a vertically extending strut housing 22 for a McPherson strut (not shown). The strut housing 22 is spaced from the engine compartment wall 16 to define a gap 24. The vehicle also includes a windshield 26 extending rearwardly of the engine compartment and a side door 28.

The engine compartment 12 is adapted to be covered by a closure member or hood 30. The hood 30 comprises an elongated, generally rectangular, member having an underside 32. The hood 30 adjacent its rear end 34 is adapted to be pivotally connected to the vehicle body structure 10 at the sides of the engine compartment 12 via suitable hinge means 40. The hinge means 40 will be located at both the left and right sides of the vehicle and only the right side hinge 40 is shown. The hinges 40 could be of any suitable or conventional construction and serve to pivotally connect the hood 30 to the vehicle body structure 10 for movement between an open position, as shown in FIG. 1 and by solid lines in FIG. 2, in which access is permitted to the engine compartment 12 and a closed position, as shown by the phantom lines in FIG. 2, in which the hood covers the engine compartment 12 and prevents access thereto. The hood 30 at its underside 32 when in the closed position engages the length of the seal 20 to provide a seal.

The hood 30 also is provided with a lamp 50 suitably supported on its underside. The lamp 50 could be of any suitable or conventional construction. The lamp 50 is electrically connected to a wiring harness, not shown, via a flexible electrical wire or cable 52. The cable 52 extends from the lamp 50 along the underside 32 of the hood and down into the engine compartment 12 wherein it would be connected to a suitable electrical wiring harness via connectors (not shown). The wire cable 52 is suitably connected and secured to the underside of the hood 32 via clips 58.

In accordance with the provisions of the present invention, a novel strap means 60 is provided for preventing the electrical cable 52 from folding back onto itself so as to be pinched between the seal 20 and the underside 32 of the hood 30 when the latter is moved to its closed position. The strap 60 can be made from any suitable memory plastic material, preferably polypropylene. The strap 60 has a uniform thickness and width, is rectangular in cross-sectional shape and has one end 62 secured or connected to the fire wall 16 via a headed Christmas tree connector 64 whose shank 64a is forced through aligned openings at the lower end 62 of the strap and the fire wall 16 to secure the same to the fire wall 16, as shown in FIG. 2. The strap 60 at its upper end 66 is connected to the underside 32 of the hood 30 via a Christmas tree fastener 68 whose shank 68a is forced through aligned openings in the upper end 66 of the strap and the underside 32 of the hood 30 to secure the upper end 66 of the strap 60 to the underside 32 of the hood 30. The strap 60 is at all times self-biased toward a generally circular loop position located away from the seal 20, as shown by the phantom lines in FIG. 2.

The wire cable 52 is secured to the strap 60 at its forwardly facing side 80 via a tape 82. The tape is wrapped around the cable 52 and the strap 60 for predetermined length therealong at the bight of the loop as shown in FIG. 2 in phantom. The strap 60 by being self-biased to the phantom line position shown in FIG. 2 also holds the cable 52 away from the seal means 20.

As can be seen in FIG. 2, when the hood 30 is moved to its open position, the strap 60 is moved against its self-biasing force to the arcuate position shown in the solid lines in FIG. 2. Since the hood 30 is held in its open position by springs (not shown) which exert a greater force than the strap 60, the strap will be retained in the solid line position in FIG. 2 as long as the hood 30 is open. When the hood 30 is moved from its open position towards its closed position, the self-biasing force of the strap 60 will cause the cable 52 and the strap 60 to be returned towards its phantom line loop position shown in FIG. 2. In this position, the cable 52 and strap 60 are located away from the seal 20 and thus the cable 52 cannot fold back onto itself and be pinched between the seal 20 and the underside 32 of the hood 30.

Although the invention disclosed herein has been shown and described in connection with an engine compartment and a hood, it will of course be understood by those skilled in the art, that the invention could be equally applied to a deck lid for covering a trunk compartment of a vehicle.

From the foregoing, it should be understood that an inexpensive, simple and highly effective foolproof means has been provided for preventing an electrical cable from folding back onto itself so as to be pinched between a seal carried by body structure defining a compartment and a closure therefor when the latter is moved towards its closed position.

Although the illustrated embodiment hereof has been described in great detail, it should be apparent that certain modifications, changes and adaptations may be made in the illustrated embodiment, and that it is intended to cover all such modifications, changes and adaptations which come within the spirit of the present invention.

The embodiments of the invention in which an exclusive property or privilege is claimed are defined as follows:

I claim:

1. In an automotive vehicle having body structure defining a compartment having an opening, a closure pivotally connected adjacent one end to said body structure for movement between a closed position in which it prevents access to said compartment via said opening and an open position in which it permits access to said compartment via said opening,
    a lamp means secured to said closure at its underside,
    a flexible electrical cable extending from said compartment to said lamp and secured to the underside of said closure, said cable flexing when said closure is moved between said positions,
    the improvement comprising a strap having one end connected to said underside of said closure adjacent said one end thereof and its other end connected to said body structure adjacent its end located adjacent to said one end of said closure, said strap being self-biased to a generally circular loop position located away from said ends of said closure and said body structure,
    and means for securing said electrical cable to said strap whereby said cable is at all times biased away from said ends of said closure and body structure so that it cannot be pinched between said ends when the closure is moved to its closed position.

2. In an automotive vehicle having body structure defining a compartment having an opening and a seal along one edge of said body structure defining said compartment,
    a closure pivotally connected adjacent one end thereof to said body structure for movement between a closed position in which it prevents access to said compartment via said opening and an open position in which it permits access to said compartment via said opening,
    a lamp means secured to said closure at its underside,
    a flexible electrical cable extending from a said compartment to said lamp and secured to the underside of said closure,
    said cable flexing when said closure is moved between its position, the improvement comprising a strap having one end connected to said underside of said closure adjacent said one end thereof and its other end connected to said body structure adjacent said seal,
    said strap being self-biased to a generally circular loop position located away from said seal and said one end of said closure,
    and tape means for taping said electrical cable to said strap at its side facing away from said seal so that said cable is at all times biased away from said seal of said compartment and said one end of said closure whereby it can not be pinched between the seal and the closure when the closure is moved to its closed position.

3. In an automotive vehicle having body structure defining an engine compartment having a top opening and a seal extending transversely of the vehicle body structure along its rearward edge defining the engine compartment,
    a hood pivotally connected adjacent its rear end to said body structure for movement between a closed position in which it prevents access to said engine compartment and an open position in which it permits access to said engine compartment via the opening,
    a lamp means connected to said hood at its underside,
    a flexible electrical cable extending from
    said engine compartment to said lamp means and secured to the underside of said hood,
    said cable flexing when said hood is moved between its positions, the improvement comprising a plastic strap having one end connected to the underside of the hood adjacent its rear end and its other end connected to the vehicle body structure adjacent said seal,
    said strap being self-biased to a generally circular loop position located away from said seal and said rear end of said hood,
    and tape means for securing said electrical cable to said strap along its side facing away from said seal whereby the cable is at all times biased away from said seal and rear end of said hood so that it cannot be pinched between the seal and the rear end of the hood when the latter is moved to its closed position.

4. In an automotive vehicle, as defined in claim 3, and wherein said strap has a uniform thickness and width.

5. In an automotive vehicle, as defined in claim 4, and wherein said strap at its opposite ends is secured to the vehicle body structure and the underside of the hood via a quick connect fastener which is pushed through aligned openings in the strap and said body structure and hood, respectively.

* * * * *